United States Patent [19]

Parker

[11] Patent Number: 5,735,173
[45] Date of Patent: Apr. 7, 1998

[54] PIVOTALLY LINKED POSITION CONTROL DRIVE SYSTEM

[75] Inventor: Ronald W. Parker, Clinton, Conn.

[73] Assignee: Probot Incorporated, Branford, Conn.

[21] Appl. No.: 538,929

[22] Filed: Oct. 4, 1995

[51] Int. Cl.⁶ .................................... F16H 27/02
[52] U.S. Cl. .................... 74/89; 74/471 XY; 310/12; 318/135; 335/229
[58] Field of Search ................ 74/89, 471 XY; 310/12; 318/135; 335/220, 229; 104/282, 283

[56] References Cited

U.S. PATENT DOCUMENTS

| | | | |
|---|---|---|---|
| 3,048,385 | 8/1962 | Reynolds | 74/89 |
| 3,264,889 | 8/1966 | Machida | 74/89 |
| 3,268,785 | 8/1966 | Gerber et al. | |
| 3,771,032 | 11/1973 | Hender | |
| 3,857,075 | 12/1974 | Sawyer | |
| 4,032,824 | 6/1977 | Elger | |
| 4,152,994 | 5/1979 | Sugiyama | |
| 4,507,598 | 3/1985 | Wakabayashi et al. | |
| 4,525,655 | 6/1985 | Walker | |
| 4,565,104 | 1/1986 | Akin | 74/89 |
| 4,821,595 | 4/1989 | Podeschwa et al. | |
| 4,834,353 | 5/1989 | Chitayat | |
| 4,995,277 | 2/1991 | Yanagisawa | 74/471 XY |
| 5,083,074 | 1/1992 | Suzuki et al. | |
| 5,107,206 | 4/1992 | Yanagi et al. | |
| 5,123,174 | 6/1992 | Noguchi | |
| 5,163,794 | 11/1992 | Enos | |
| 5,501,119 | 3/1996 | Yanagisawa | 74/89.15 |

*Primary Examiner*—Charles A. Marmor
*Assistant Examiner*—David M. Fenstermacher
*Attorney, Agent, or Firm*—Gregory S. Rosenblatt; Wiggin & Dana

[57] ABSTRACT

There is provided a position control drive system having first and second drive units linked together and travelling on parallel running rails. A passive unit riding on a third parallel running rail is pivotally linked to one of the drive units. The pivoting link allows movement of the drive units longitudinally along the rails, but prevents movement in other directions. The pivot compensates for positional differences between the electronic positional control of the drive units and the mechanical linkage preventing the inefficiency in the electronic system, stresses in the mechanical system and, in severe cases, binding of the drive units to the rails.

19 Claims, 6 Drawing Sheets

5,735,173

PIVOTALLY LINKED POSITION CONTROL DRIVE SYSTEM

BACKGROUND OF THE INVENTION

1. Field of the Invention

This invention relates to a multi-drive position control gantry system. More particularly, pivotally linking two rigidly linked drive motors to a passive guide rail reduces binding when the drive motors are non-synchronous.

2. Description of Related Art

The accurate positioning of a stylus along a precise line of position in a gantry system, such as in industrial embroidery machines and X-Y plotters, frequently utilizes two rigidly linked drive units that travel along parallel running rails.

In one such unit, the rails are formed from a non-magnetic material such as stainless steel or a polymer. Permanent magnet cross beams intersect the track at regular intervals. A drive device, such as a linear motor, includes an armature closely spaced from the permanent magnets. An encoder mounted on the drive device transmits electrical pulses to the armature. The number and frequency of pulses control the movement of the drive device along the rail.

Rigidly linking multiple devices divide the load and the rigid link can function as a rail to guide a stylus in a direction perpendicular to the parallel running rails. This system is disclosed in U.S. Pat. Nos. 4,507,598 to Wakabayashi et al. and 4,834,353 to Chitayat, both of which are incorporated by reference in their entireties herein.

The drive units are mechanically and electronically linked together. Any slight positional difference between the electronic positional control and the mechanical linkage causes the two systems (electronic and mechanical) to fight against each other resulting in a gross inefficiency in the electronic positional system and unnecessary stresses on the mechanical system. In severe cases, a motor housing rotates against a rail causing the system to bind.

There remains a need for a multiple drive unit positioning system that compensates for non-synchronization between the electronic position control and the mechanical linkage.

SUMMARY OF THE INVENTION

Accordingly, it is an object of the invention to provide a position control drive system containing multiple rigidly linked drive systems that compensates for positional errors. It is a feature of the invention that the drive units are mechanically linked to each other and pivotally linked to an outboard passive unit. Yet another feature is that the units travel along parallel running rails.

An advantage of this position control drive system is that the multiple drive units better distribute a load and also provide accurate position along a single axis. An optional drive unit traveling along the rigid mechanical linkage provides accurate two-dimensional (X and Y) position control. An advantage is that the system can compensate for control errors in the positioning of the multiple drive units.

In accordance with the invention, there is provided a position control drive system. The system has first, second and third spaced, parallel running, rails. A first electronically responsive drive unit is mechanically coupled to the first rail while a second electronically responsive drive unit is mechanically coupled to the second rail. A passive guide unit is mechanically coupled to the third rail. A mechanical linkage rigidly links the first drive unit to the second drive unit with a desired position point disposed between the first drive unit and the second drive unit and also pivotally links the second drive unit to the passive guide unit.

The above stated objects, features and advantages, will become more apparent from the specification and drawings that follow.

IN THE DRAWINGS

DETAILED DESCRIPTION

Figure 1:
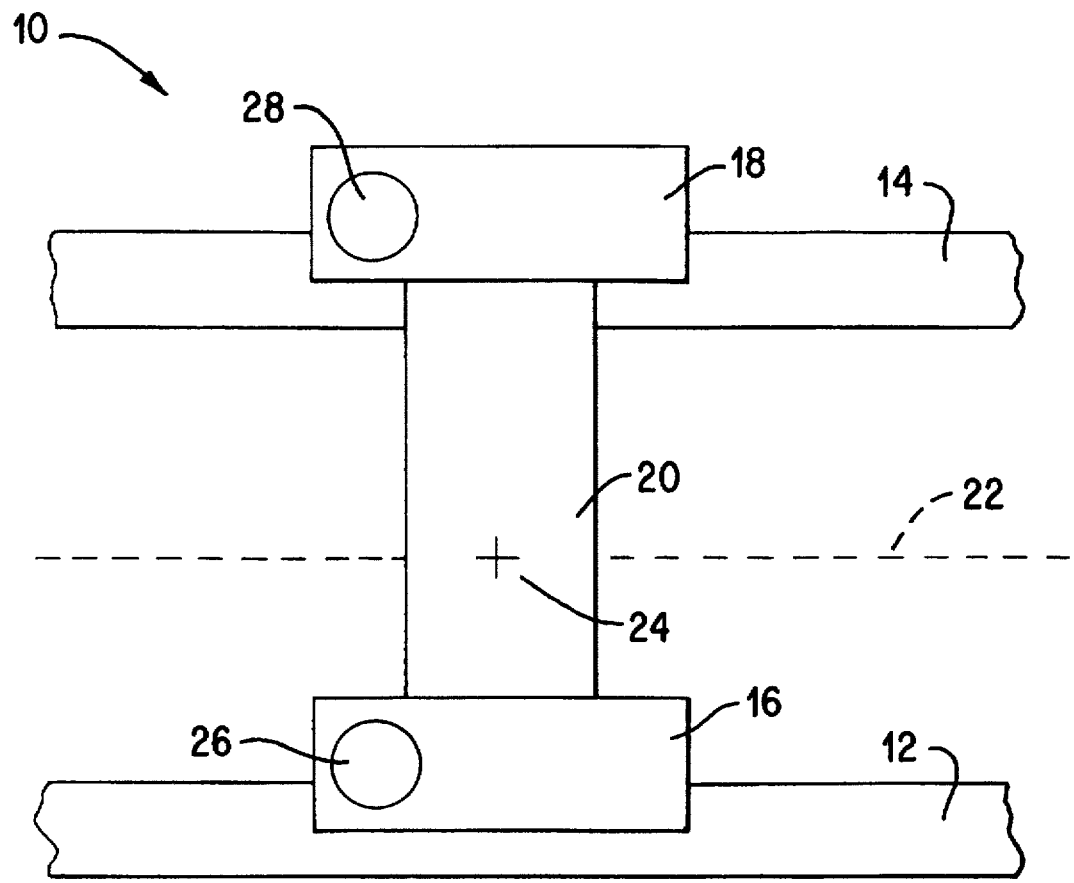
FIG. 1 illustrates a two-motor drive system as known from the prior art.

FIG. 1 illustrates a two-drive position control system 10 as known from the prior art. The system 10 includes a first rail 12 and a second rail 14 that are parallel to each other. Mechanically coupled to the first rail 12 is a first drive unit 16. Mechanically coupled to the second rail 14 is a second drive unit 18. The first drive unit 16 and second drive unit 18 are rigidly linked together by a linkage 20. The linkage 20 causes the first drive unit 16 and second drive unit 18 to operate in concert with one another distributing a load transported by the system 10.

The coupling of the drive units to the rails and to each other forms a rigid system providing accurate positional control. A position line 22 will always underlie the same control point 24 of the linkage 20. The drive system delivers a stylus accurately to any position along position line 22.

Motion of the drive units 16,18 is controlled by first 26 and second 28 electronic controllers. Electrical pulses communicated from the electronic controllers 26,28 cause the drive units to move along the rails.

Any slight positional difference between the electronic positional control defined by the electronic controllers 26,28 and the mechanical linkage 20 causes the electronic and mechanical systems to fight each other. In severe cases, the drive units bind to the rails causing the system to fail.

Figure 2:
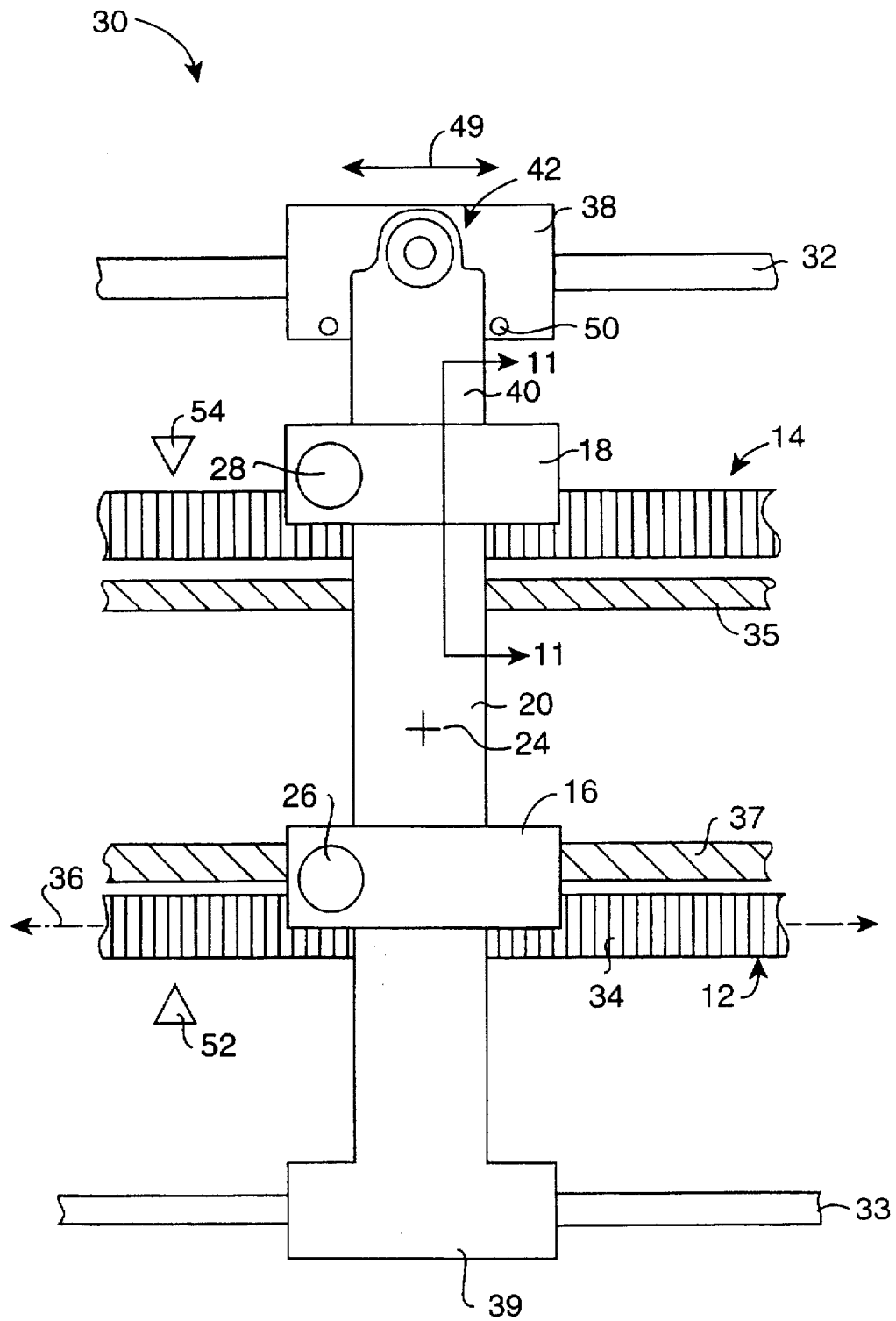
FIG. 2 illustrates a two-motor drive system in accordance with the invention.

The two-position drive control system 30 of the invention, illustrated in FIG. 2, better compensates for positional differences between the electronic positional control and the mechanical linkage. Many of the elements of the system 30 are similar to elements of the system 10 and similar elements are identified by like reference numerals.

The system 30 includes first 12, second 14, third 32 and fourth 33 spaced rails that run parallel to each other. A first electronically responsive drive unit 16 is mechanically coupled to the first rail 12. A second electronically responsive drive unit is mechanically coupled to the second rail 14. First 26 and second 28 electronic controllers provide electrical pulses causing the first 16 and second 18 drive units to move along the rails. These pulses are derived from the positions of two encoders. Encoder 35 controls the position of drive unit 18 and encoder 37 controls the position of drive unit 16.

The system 30 is amenable to any linearly moving drive system. In one preferred embodiment, the first rail 12 and second rail 14 are formed from steel. Closely spaced permanent magnets 34 are glued to the rails and run transverse to the longitudinal axis 36 of the rails 12,14. Typically, these permanent magnets 34 are spaced from about 0.2 inch to about 0.5 inch apart and constitute the stator of the magnetic drive system.

In one preferred system, the rails are approximately 2 inches long, by 0.2 inch thick by 0.875 inch wide and spaced 0.375 inch apart.

The drive units 16,18 are mechanically coupled to the rails by a frictionless, electromagnetic field and glide along the rails on a magnetic field. There is no physical contact between the drive and the stator.

Figure 3:
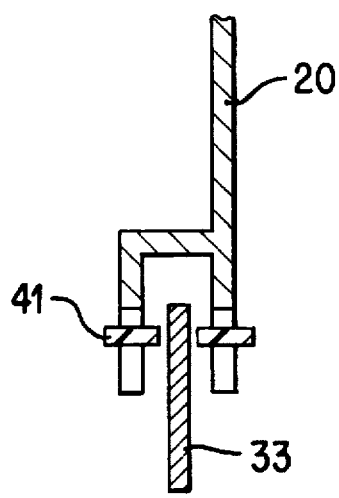
FIG. 3 and FIG. 4 illustrate a position maintaining slide in accordance with the invention.
Figure 4:
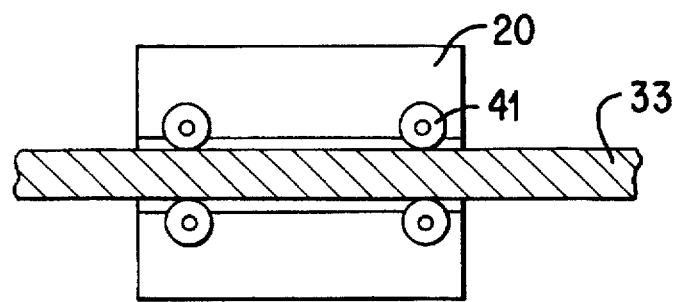

A slide 39 with ball bearings is located at the end of the linkage 20 opposite the third rail 32. As best illustrated in FIG. 3 (side view) and FIG. 4 (top view), the bearings 41 maintain the position of the linkage 20 in an axis perpendicular to the plane of FIG. 2. The bearings 41 are arranged in pairs and ride on opposite sides of a case hardened fourth rail 33.

With reference back to FIG. 2, electronic pulses provided by electronic controllers 26,28 energize a coil located within the respective drive units causing the drive units to travel along the rails.

Figure 11:
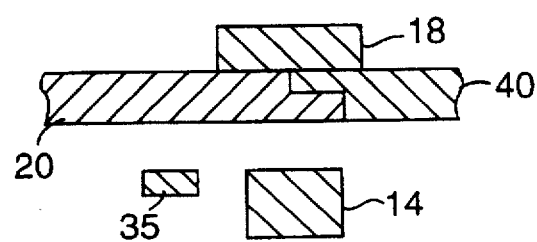
FIG. 11 shows in cross-sectional representation a multi-piece linkage in accordance with an embodiment of the invention.

The linkage 20 rigidly links the first drive unit 16 to the second drive unit 18. A passive guide unit 38 is linked to the second drive unit 18 in opposition to the first drive unit 16. A mechanical link 40 between the passive unit 38 and the second drive unit 18 may be an extension of the linkage 20 or a separate member (as illustrated in FIG. 11), with a unitary extension being preferred. Referring back to FIG. 2, the mechanical link 40 is rigidly bonded to the second drive unit 18 and pivotally bonded to the passive unit 38.

Figure 5:
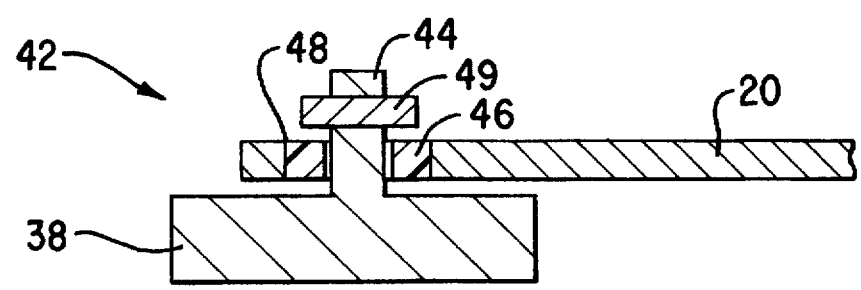
FIG. 5 illustrates in cross-sectional representation a pivoting linkage in accordance with the invention.

The pivoting linkage 42 is illustrated in cross-sectional representation in FIG. 5. A pivot 44, such as a bearing or a post, protrudes from the passive unit 38. When a bearing, the pivot 44 is seated in a hemispherical depression formed in the passive unit 38. When a post, the pivot 44 can be threaded into a tapped hole in the passive unit 38, pressfit into place or joined by a soldering or welding operation. Circumscribing the pivot 44 is a low friction bushing 46 such as a TEFLON (trademark of DuPont, Wilmington, Del.) plastic or other low friction polymer gasket. The low friction bushing is pressfit into an aperture 48 formed in the linkage 20. A lock nut 49 or other means prevents vertical displacement of the linkage 20.

Figure 6:
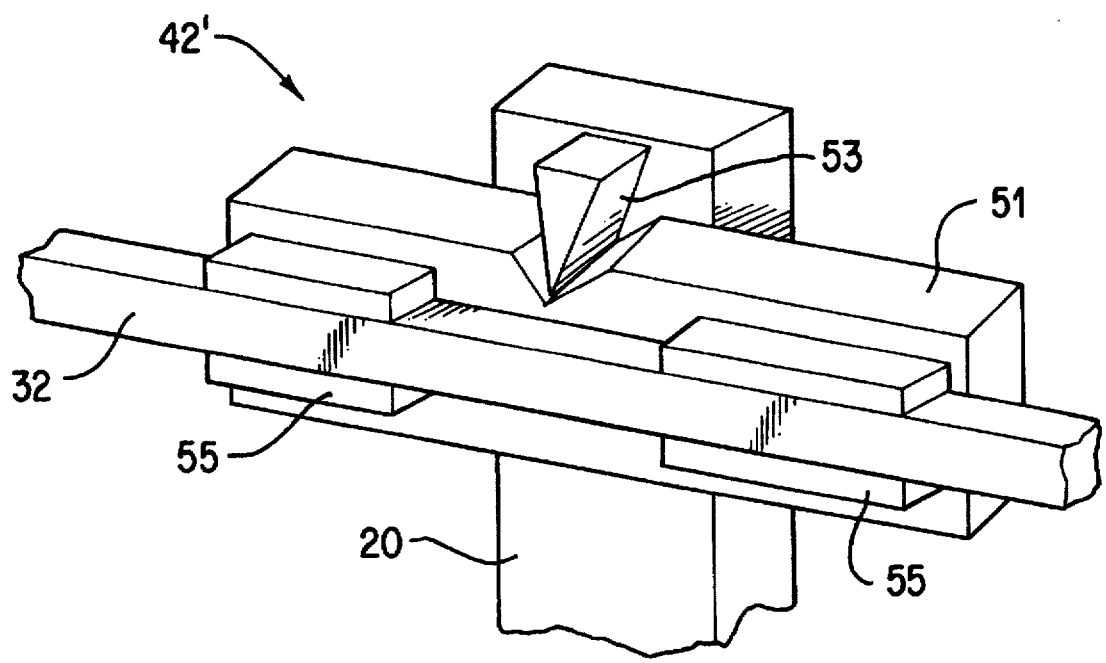
FIG. 6 and FIG. 7 illustrate alternative pivoting linkages.
Figure 7:
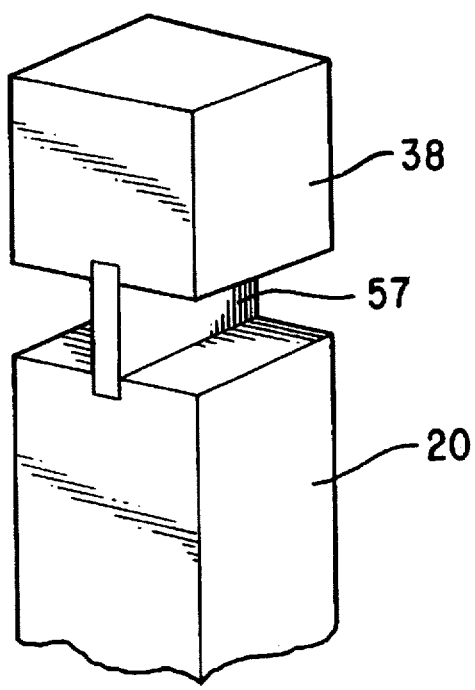

Alternative pivoting linkages 42' and 42" are illustrated in FIGS. 6 and 7. In FIG. 6, the pivoting linkage 42' includes a grooved member 51 as the passive guide unit. Movement of the grooved member 51 is constrained by a wedge 53 attached to linkage 20. Roller bearings 55 connect the grooved member 51 to the third rail 32.

In FIG. 7, the pivoting linkage 42" is a spring steel member 57 or similar flexible material. One end of the flexible member 57 is attached to the passive guide unit 38 and the opposing end to the linkage 20.

In yet another embodiment, lubricated, tapered roller bearings form the pivoting linkage.

With reference back to FIG. 2, when the system 30 moves along the parallel running rails 12, 14, 32, 33 in the direction of motion identified by reference arrow 49, the linkage 20 between the first drive unit 16 and second drive unit 18 accurately positions the control point 24. If a positional difference develops between the electronic positional control as embodied by the electronic controllers 26, 28 and the mechanical linkage as embodied by linkage 20, the pivoting linkage 42 prevents motion in any direction except for that indicated by reference arrow 49. The pivoting linkage 42 allows the drive units 16,18 to be in different horizontal positions without having the housing of the drive units bind against the rails 12,14. The result is that there is no stiff mechanical linkage between the drive units 16,18 in the horizontal plane, the plane of motion, and the electronic control 26,28 is the primary control in this plane.

Excessive rotation about the pivoting linkage 42 may cause the drive units to bind against the rails 12,14. Mechanical stops 50 optionally limit the degree of rotational freedom of the pivoting link 42.

Figure 8:
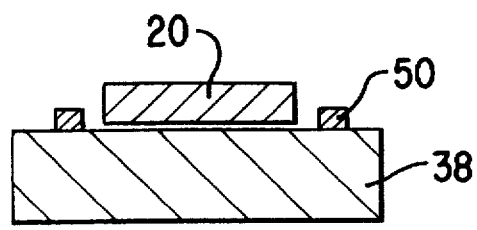
FIG. 8 illustrates in cross-sectional representation a mechanical stop in accordance with the invention.

As illustrated in cross-sectional representation in FIG. 8, mechanical stops 50 protrude from the passive unit 38 and limit the rotational freedom of the mechanical link 40. Preferably, the rotational freedom of the mechanical link 40 comprises an arc having a maximum of 3.0° and more preferably having a maximum of 1.5°.

In the system 30, illustrated in FIG. 2, the electronic positional control is not rigidly linked to the mechanical linkage. Calibration is required to determine the position of the first drive unit 16 relative to the second drive unit 18 and the location of the control point 24. In a preferred embodiment of the invention, calibration is provided by the following steps:

1. The first drive unit 16 is electronically energized and moved a first distance to a first desired location 52.
2. The second drive unit 18 is then electronically energized and moved to the second desired location 54 while the first drive unit 16 is maintained at position 52.
3. The second drive unit 18 is then made positionally dependent upon the first drive unit 16 by continuously comparing the position of each drive unit 16,18 by means of the encoders 35,37 to effectively lock the two motors together electronically.

While the preceding calibration procedure is one method of making the second drive unit positionally dependent upon the first, other calibration methods are equally suitable.

While the drive units of the invention have been described in terms of linear motors, other drive units are applicable.

Figure 9:
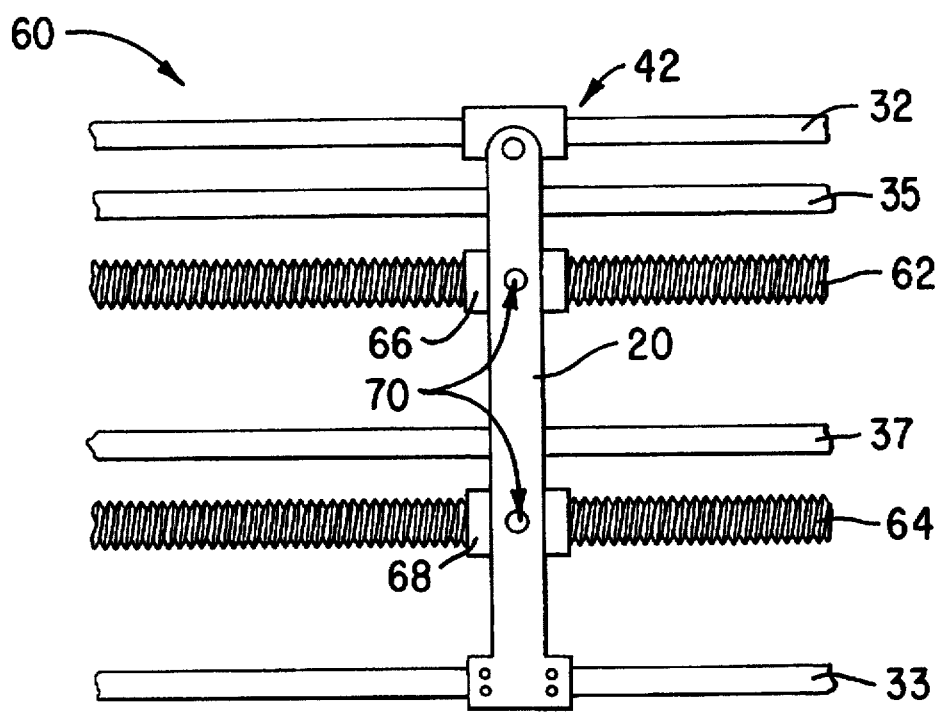
FIG. 9 and FIG. 10 illustrate alternative drive mechanisms.

FIG. 9 illustrates a system 60 that utilizes first 62 and second 64 ball screws. First 66 and second 68 threaded drive units are coupled to respective ball screws. The drive units are further coupled to the linkage 20 by pivots 70.

Figure 10:
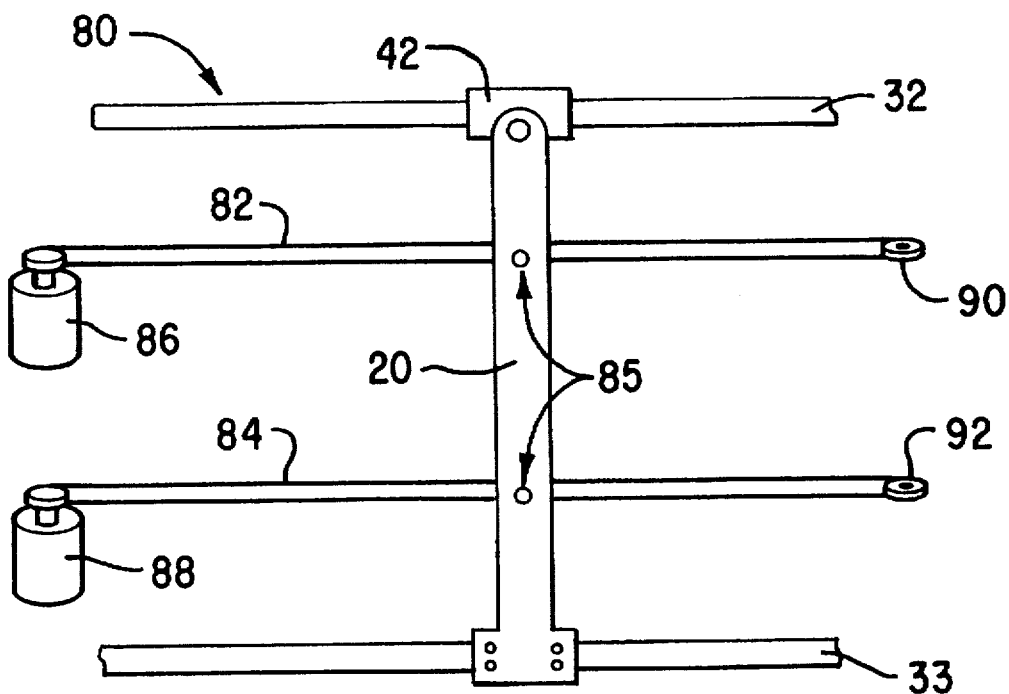

In FIG. 10, the system 80 has first 82 and second 84 cables attached, preferably, at a single point 85 to the linkage 20. First 86 and second 88 motors drive the respective cables, 82,84 around first 90 and second 92 respective idler pulleys.

It is apparent that there has been provided in accordance with this invention a position control drive system that fully satisfies the objects, means and advantages set forth hereinbefore. While the invention has been described in combination with embodiments and examples thereof, it is evident that many alternatives, modifications and variations will be apparent to those skilled in the art in light of the foregoing description. Accordingly, it is intended to embrace all such alternatives, modifications and variations as fall within the spirit and broad scope of the appended claims.

I claim:

1. A position control drive system, comprising:
    first, second and third spaced, parallel running rails with said third rail being in opposition to said first rail and said second rail being disposed between said first rail and said third rail;

a first electronically responsive drive unit electromagnetically coupled to said first rail;

a second electronically responsive drive unit electromagnetically coupled to said second rail;

a passive guide unit mechanically coupled to said third rail;

a first linkage rigidly linking said first drive unit to said second drive unit with a desired control point disposed therebetween; and a second linkage pivotally linking said second drive unit to said passive guide unit thereby preventing binding of the drive units against the rails.

2. The system of claim 1 wherein said first linkage and said second linkage are separate members joined at the second drive unit.

3. The system of claim 1 wherein said first linkage and said second linkage are components of a unitary member.

4. The system of claim 3 wherein said second linkage is pivotally linked to said passive guide unit by a bearing.

5. The system of claim 4 wherein said second linkage is inhibited from rotating more than 3° about said bearing.

6. The system of claim 5 wherein said second linkage is inhibited from rotating more than 1.5° about said bearing.

7. The system of claim 5 wherein said first drive unit and said second drive unit are ball screws.

8. The system of claim 5 wherein said first drive unit and said second drive unit are motor driven cables.

9. The system of claim 5 wherein said first drive unit and said second drive unit are linear motors and said first rail and said second rail are intersected by a plurality of permanent magnets.

10. The system of claim 9 wherein said permanent magnets are parallel to each other and separated by a distance of from about 0.2 inch to about 0.5 inch.

11. The system of claim 9 further including a fourth, parallel running rail adjacent to and spaced from said first rail.

12. The system of claim 11 wherein said linkage is slidably coupled to said fourth rail.

13. The system of claim 4 wherein said bearing is supported by a hemispherical depression.

14. A position control drive system, comprising:

first, second and third spaced, parallel running rails with said third rail in opposition to said first rail and said second rail being disposed therebetween;

a first electronically responsive drive unit electromagnetically coupled to said first rail;

a second electronically responsive drive unit electromagnetically coupled to said second rail;

a passive guide unit mechanically coupled to said third rail;

a first linkage rigidly linking said first drive unit to said second drive unit with a desired control point disposed therebetween; and a second linkage pivotally linking said second drive unit to said passive guide unit by a pin extending from said passive guide unit through an aperture formed in said second linkage, wherein said first linkage and said second linkage are components of a unitary member.

15. The system of claim 14 wherein said aperture contains a low friction polymeric bushing.

16. The system of claim 14 wherein said second linkage is inhibited from rotating more than 3° about said bearing.

17. The system of claim 16 wherein said first drive unit and said second drive unit are linear motors and said first rail and said second rail are intersected by a plurality of permanent magnets.

18. The system of claim 17 wherein said permanent magnets are parallel to each other and separated by a distance of from about 0.2 inch to about 0.5 inch.

19. The system of claim 16 wherein said second linkage is inhibited from rotating more than 1.5° about said bearing.

* * * * *